(12) United States Patent
Tavares Miranda

(10) Patent No.: US 11,396,937 B2
(45) Date of Patent: Jul. 26, 2022

(54) CHAINRING

(71) Applicant: MIRANDA & IRMAO, LDA, Agueda (PT)

(72) Inventor: Joao Filipe Tavares Miranda, Agueda (PT)

(73) Assignee: MIRANDA & IRMAO, LDA, Agueda (PT)

( * ) Notice: Subject to any disclaimer, the term of this patent is extended or adjusted under 35 U.S.C. 154(b) by 198 days.

(21) Appl. No.: 16/613,030

(22) PCT Filed: Mar. 8, 2018

(86) PCT No.: PCT/EP2018/055840
§ 371 (c)(1),
(2) Date: Nov. 12, 2019

(87) PCT Pub. No.: WO2018/206179
PCT Pub. Date: Nov. 15, 2018

(65) Prior Publication Data
US 2020/0063850 A1 Feb. 27, 2020

(30) Foreign Application Priority Data
May 12, 2017 (WO) ................ PCT/EP2017/061507

(51) Int. Cl.
*F16H 55/30* (2006.01)
*B62M 9/06* (2006.01)
(Continued)

(52) U.S. Cl.
CPC ............... *F16H 55/30* (2013.01); *B62M 9/06* (2013.01); *B62M 9/105* (2013.01); *B62M 9/131* (2013.01)

(58) Field of Classification Search
CPC . F16H 55/30; F16H 7/06; B62M 9/10; B62M 9/105
(Continued)

(56) References Cited

U.S. PATENT DOCUMENTS 4,174,642 A 11/1979 Martin et al.
6,203,462 B1 * 3/2001 Takamori ................. B62M 9/02
474/156
(Continued)

FOREIGN PATENT DOCUMENTS

CN 104229057 A 12/2014
CN 106564558 A 4/2017
(Continued)

OTHER PUBLICATIONS

International Search Report and Written Opinion for Corresponding International Application No. PCT/EP2017/061507 (8 Pages) (dated Feb. 13, 2018).
(Continued)

*Primary Examiner* — Henry Y Liu
(74) *Attorney, Agent, or Firm* — Lucas & Mercanti, LLP

(57) ABSTRACT

A sprocket for engagement with a drive chain has a first and a second group of teeth, wherein the teeth of the first group and the second group are alternately arranged and each tooth of the second group is wider than each tooth of the first group. The profile of each tooth of the second group has a first protrusion in the front half of the tooth on a first lateral surface and a second protrusion in the rear half of the tooth on a second, opposite lateral surface of the tooth. In particular, the portion of each tooth of the second group engaging the chain may have a center plane that is rotated or twisted during forming about the radial center line of the tooth with respect to the central plane of the sprocket.

9 Claims, 4 Drawing Sheets

(51) Int. Cl.
*B62M 9/10* (2006.01)
*B62M 9/131* (2010.01)

(58) Field of Classification Search
USPC .......................................................... 474/156
See application file for complete search history.

(56) References Cited

U.S. PATENT DOCUMENTS

| | | | |
|---|---|---|---|
| 8,506,436 B2* | 8/2013 | Wickiffe | B62M 9/105 |
| | | | 474/160 |
| 8,888,631 B2* | 11/2014 | Morita | F16H 55/30 |
| | | | 474/153 |
| 9,062,758 B2* | 6/2015 | Reiter | F16H 55/30 |
| 9,086,138 B1 | 7/2015 | Emura | |
| 9,150,277 B2 | 10/2015 | Emura et al. | |
| 9,291,250 B2* | 3/2016 | Reiter | F16H 55/303 |
| 9,394,986 B2 | 7/2016 | Pfeiffer | |
| 9,394,987 B2 | 7/2016 | Pfeiffer | |
| 9,540,070 B2 | 1/2017 | Watarai et al. | |
| 9,581,229 B2 | 2/2017 | Pfeiffer | |
| 9,581,230 B2 | 2/2017 | Pfeiffer | |
| 10,247,291 B2 | 4/2019 | Akanishi | |
| 10,359,106 B2 | 7/2019 | Akanishi | |
| 10,378,637 B2 | 8/2019 | Ooishi et al. | |
| 10,577,050 B2 | 3/2020 | Akanishi et al. | |
| 10,578,201 B2 | 3/2020 | Reiter et al. | |
| 2002/0098934 A1* | 7/2002 | Wigsten | F16H 55/30 |
| | | | 474/212 |
| 2006/0128511 A1* | 6/2006 | Oishi | B62M 9/10 |
| | | | 474/160 |
| 2007/0054768 A1* | 3/2007 | Miyazawa | F16H 55/30 |
| | | | 474/152 |
| 2013/0139642 A1* | 6/2013 | Reiter | B62M 9/08 |
| | | | 74/594.2 |
| 2013/0184110 A1 | 7/2013 | Reiter | |
| 2014/0338494 A1 | 11/2014 | Sugimoto | |
| 2014/0364259 A1* | 12/2014 | Reiter | F16H 55/30 |
| | | | 474/155 |
| 2015/0198231 A1* | 7/2015 | Emura | F16H 7/06 |
| | | | 474/156 |
| 2015/0226305 A1* | 8/2015 | Pfeiffer | B62M 9/105 |
| | | | 474/152 |
| 2015/0239528 A1 | 8/2015 | Barefoot et al. | |
| 2015/0285362 A1* | 10/2015 | Pfeiffer | B62M 9/10 |
| | | | 474/152 |
| 2015/0285363 A1* | 10/2015 | Pfeiffer | F16H 55/30 |
| | | | 474/152 |
| 2015/0285364 A1* | 10/2015 | Pfeiffer | B62M 9/10 |
| | | | 474/152 |
| 2015/0337943 A1 | 11/2015 | Sugimoto | |
| 2015/0362057 A1* | 12/2015 | Wesling | B62M 9/10 |
| | | | 474/152 |
| 2016/0238122 A1 | 8/2016 | Medaglia et al. | |
| 2016/0280325 A1 | 9/2016 | Watarai et al. | |
| 2017/0101159 A1* | 4/2017 | Watarai | F16H 55/30 |
| 2017/0234418 A1* | 8/2017 | Barefoot | F16H 55/30 |
| | | | 474/156 |
| 2017/0276229 A1 | 9/2017 | Reiter et al. | |
| 2017/0283005 A1* | 10/2017 | Inoue | F16H 55/30 |
| 2019/0315434 A1 | 10/2019 | Watarai et al. | |

FOREIGN PATENT DOCUMENTS

| | | |
|---|---|---|
| DE | 202007010066 U1 | 9/2007 |
| EP | 2602176 A1 | 6/2013 |
| EP | 2810864 A1 | 12/2014 |
| EP | 3072799 A1 | 9/2016 |
| EP | 3072800 A1 | 9/2016 |
| EP | 3072801 A1 | 9/2016 |
| EP | 3072802 A1 | 9/2016 |
| EP | 3072803 A1 | 9/2016 |
| EP | 3075644 A1 | 10/2016 |
| WO | 03095867 A1 | 11/2003 |

OTHER PUBLICATIONS

International Search Report and Written Opinion for Corresponding International Application No. PCT/EP2018/055840 (8 Pages) (dated Jun. 8, 2018).
Office Action for Corresponding Chinese Application No. 2017800906639, dated Aug. 17, 2020, 5 Pages, English translation 4 Pages.
Extended European Search Report for corresponding European Application No. 21153252.8-1009 dated May 4, 2021, 8 Pages.

* cited by examiner

CHAINRING

CROSS REFERENCE TO RELATED APPLICATION

This Application is a 371 of PCT/EP2018/055840 filed on Mar. 8, 2018, which in turn claims the benefit of priority of International Application No. PCT/EP2017/061507 filed on May 12, 2017, both applications are incorporated herein by reference.

TECHNICAL FIELD

The present invention relates to a sprocket for engagement with a drive chain and more particularly to a chainring for a bicycle.

The sprocket has a central plane extending radially with respect to the axis of rotation and comprises:
- a plurality of teeth extending radially from a periphery of the sprocket;
- each tooth extending over a given circumferential length of the sprocket;
- the plurality of teeth including a first and a second group of teeth, wherein the teeth of the first group and the second group are alternately arranged so that each tooth of the first tooth group is followed by a tooth of the second group, and vice versa;
- each tooth of the first group of teeth having a first maximum width in the axial direction;
- each tooth of the second group of teeth having a second maximum width in the axial direction which is larger than the first maximum width.

Sprockets and in particular chainrings with alternating narrow and wide teeth have been proposed for the purpose of improving the guidance of the chain on the teeth of the sprocket. A drive chain of a vehicle like a bicycle comprises a succession of rollers connected by chain links. Each chain link is composed of a pair of link plates fixed to the axial ends of the rollers. The front of each tooth of the sprocket contacts a roller of the chain when engaged with the chain. The ends of two link plates are fixed to each axial end of a roller by means of a pin. A pair of inner link plates contacts the roller and a pair of outer link plates contacts the inner link plates. Consequently, due to the alternating succession of inner link plates and outer link plates, the lateral distance between the link plates of a chain varies in an alternating manner. The sections of the clear spaces between the inner link plates are of rectangular shape, the front end and rear end being defined by the rollers to which the link plates are attached. The sections of the clear spaces between the outer link plates have the shape of a cross or a + with smaller portions adjacent to the rollers defined by the ends of the inner link plates and a wider portion in the middle. The width of the wider portion corresponds to the distance between the outer link plates.

It has been found that the use of alternating narrow and wide teeth on a chainring provides for better guidance and engagement of the chain. This is of particular importance when a single chainring driven by cranks of a bicycle is combined with multiple sprockets fixed to the rear wheel of the bicycle in order to provide different gears. Moreover, shocks and vibrations that occur while riding on difficult terrain risk to disengage the chain from the teeth of the sprocket. Teeth that have a width closely matching the width of the spaces between the chain links have proven to be less likely to disengage due to shock or vibrations.

BACKGROUND ART

In the recent past, a number of chainrings with alternating narrow and wide teeth have been proposed for the purpose of improving the chain drive of bicycles.

US 2002/0098934 A1 and WO 03/0095867 A1describe early versions of such chainrings. A series of patent applications based on European patent application EP 2 602 176 A1 defines specific features of such chainrings, i.e. divisional applications EP 3 075 644 A1, EP 3 072 799 A1, EP 3 072 083 800 A1, EP 3 072 801 A1, EP 3 072 802 A1, EP 3 072 803 A1. The wide teeth with the protrusions of these patent applications basically have a cross shaped section that matches the cross shaped section of the respective link space in which they are to be accommodated. The documents US 2015/362057 A1, US2015/285362 A1, EP 2 810 864 A1, US 2015/226305 A1 and US 2015/198231 A1 disclose chainrings with short central projections symmetrically on both lateral sides of each tooth of the second group. The wide teeth of the chainrings have a maximum width in the axial direction which is larger than the first maximum width in the axial direction of the narrow teeth.

SUMMARY OF THE INVENTION

It is an object of the invention to provide a sprocket with alternating narrow and wide teeth that is easy to produce and remains functional in a muddy environment with a soiled chain.

This object is attained in that the profile of each tooth of the second group has a first protrusion in the front half of the tooth on a first lateral surface and a second protrusion in the rear half of the tooth on a second, opposite lateral surface of the tooth.

In other words, the protrusions on the wide teeth extending beyond the width of the teeth of the first group are only located on one side of the teeth, while the second side is free of any protrusion, wherein the front portion of the tooth has the protrusion on a first side and the rear portion of the tooth has the protrusion on the opposite side. Consequently, the link spaces between the outer chain link plates is only partly filled by the protrusions, namely on one side, so that mud and other dirt can be compressed into the free area without any protrusion when the tooth enters the link space. Nevertheless, the tooth is securely guided on both sides because the lateral protrusion is located on the first side in the front and on the second side in the rear portion of the tooth. This variety of profile combines secure guidance with relatively resistance free entrance of the tooth into the link space.

In a practical embodiment, the portion of each tooth of the second group (wide tooth) engaging the chain has a center plane that is rotated about the radial center line of the tooth with respect to the central plane of the sprocket. Consequently the shape of the teeth of the second group is very similar to the shape of the teeth of the first group. But while the teeth of the first group extend in the central plane of the sprocket, the center plane of each tooth of the second group is rotated about the radial center line of the tooth with respect to the central plane of the sprocket. This configuration can very easily be obtained by forging. Forging the final shapes of chainrings is a common method. However, known chainrings are either flat or symmetrical with respect to their central plane. It is here proposed for the first time to provide asymmetrical teeth with material on the first side in the front portion and material on the other, opposite side in the back. Forging such chainring with twisted teeth for avoiding excessive play in between the link spaces between the outer chain link plates is very cost efficient.

In practice, the angle of the center plane of each tooth of the second group and the central plane of the sprocket can be 25° or less. Each tooth of the second group may be rotated in the same direction with respect to the central plane of the sprocket. It is also possible to rotate two succeeding teeth of the second group in opposite directions.

In practice, at least the front edge of each tooth of the second group of teeth can be chamfered. Due to the rotation about the radial center line of the tooth, one of the edges of the tooth is twisted to be located in the front of the tooth in the direction of rotation of the sprocket. This edge contacts the roller of the chain. In order to avoid excessive pressure between the front edge and the roller, the front edge may be chamfered. The chamfer increases the contact surface between the tooth and the roller.

Further, the outer lateral edges of each tooth of the second group of teeth can be chamfered. In particular in case of a twisted wide tooth, the lateral edges abut against the inner faces of the outer chain link plates. The chamfer avoids a reduced contact zone and high pressure and abrasion on the inner faces of the outer chain link plates.

The invention also relates to a method of producing a sprocket as described above, in particular by means of forging. This method includes that the profile of each tooth of the second group is formed so that it has a first protrusion adjacent the front flank on a first lateral surface and a second protrusion adjacent the rear flank on a second, opposite lateral surface of the tooth.

As mentioned above, the sprocket may be formed by forging.

BRIEF DESCRIPTION OF DRAWINGS

The features and advantages of the invention will be more fully understood from the following description of one or more embodiments, in conjunction with the accompanying drawings, in which:

FIGS. 2 and 3 show a three dimensional view of a top section of a sprocket, wherein FIG. 3 shows an enlarged view of the top five teeth of the sprocket.

DESCRIPTION OF EMBODIMENTS

Figure 1:
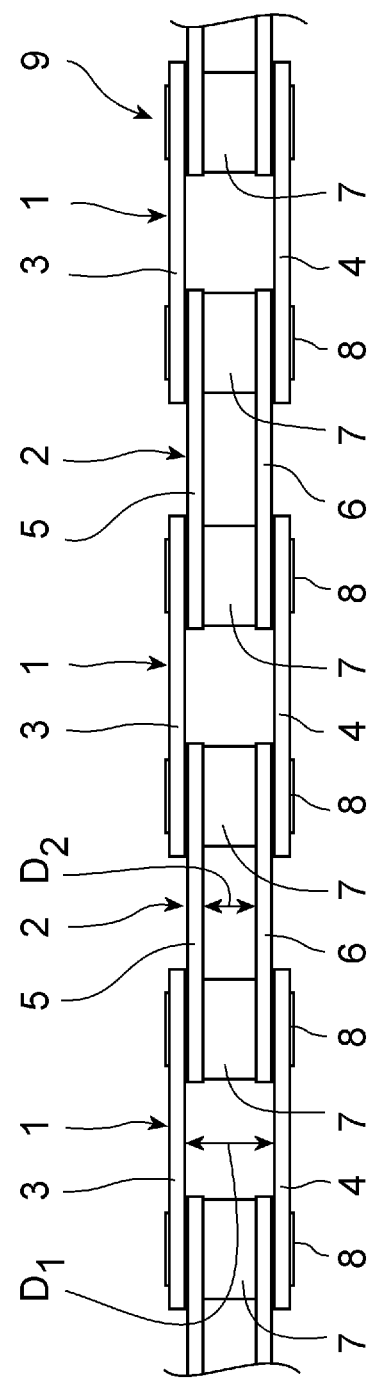
FIG. 1 shows a schematic view of a drive chain of a bicycle.

FIG. 1 shows a top view of a stretched roller chain as conventionally used for driving a bicycle or an e-bike. The drive chain 9 is composed of a succession of outer chain links 1 followed by inner chain links 2. Each outer chain link 1 is composed of two outer link plates 3 and 4. The inner faces of the outer link plates 3 and 4 contact the outer faces of inner link plates 5 and 6, which form the inner chain link 2. The inner faces of the inner link plates 5 and 6 contact a roller 7 at each end of the inner chain links 5 and 6. A pin 8 extends through holes in the end sections of the outer link plates 3, 4, and inner link plates 5, 6, as well as through the roller 7. The ends of the pins 8 are deformed in order to securely fix the link plates 3-6 to the rollers 7. It can be seen in FIG. 1 that the drive chain has a succession of link spaces with a great width $D_1$ between the outer link plates 3, 4, and link spaces with a smaller width $D_2$ between the inner link plates 5, 6.

Figure 3:
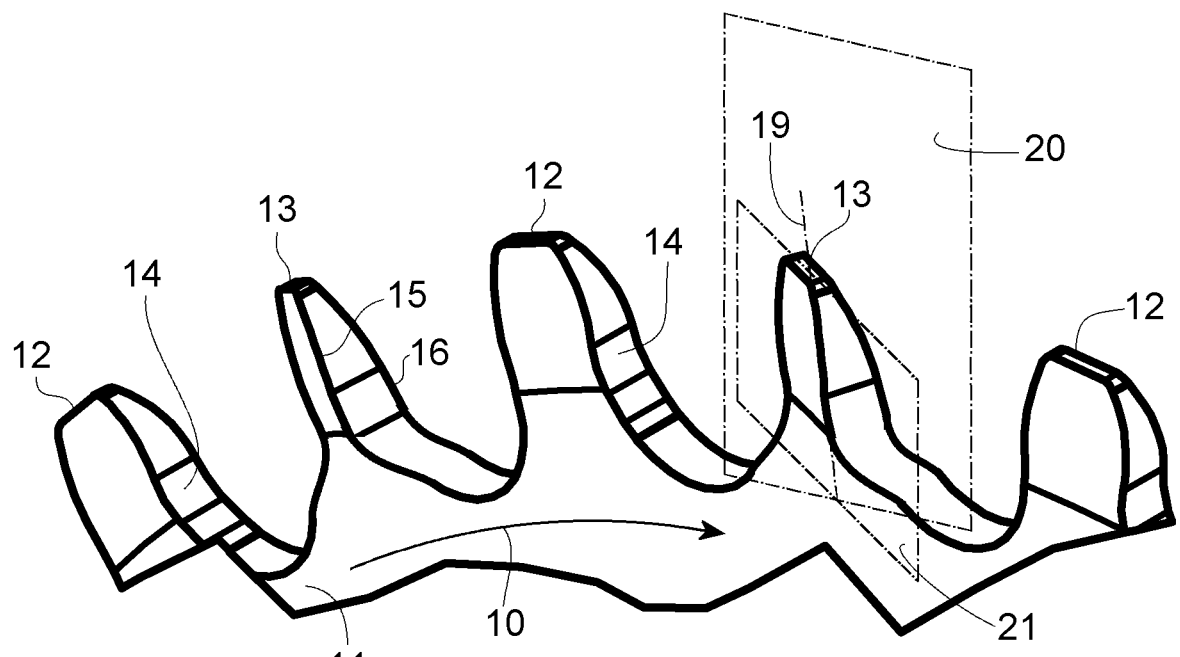
Figure 2:
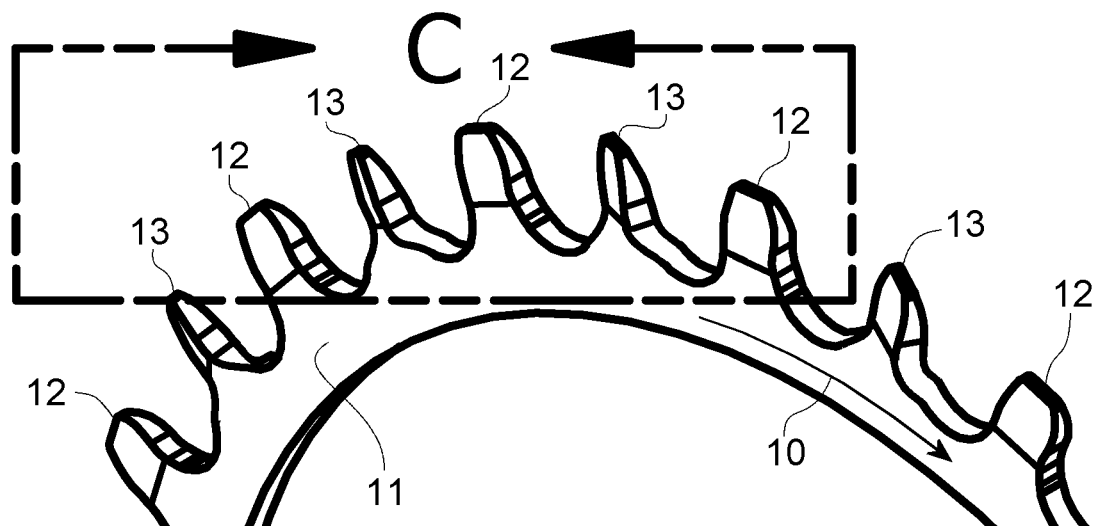

FIGS. 2 and 3 visualize the structure of the new sprocket described herein. The sprocket 11 is preferably a single chainring that may be fixed to a crank set of a bicycle. The arrows 10 in FIGS. 2 and 3 indicate the direction of rotation during regular drive operation of the sprocket 11 when driven by the crank in order to move the bicycle forward. The head of each of the arrows 10 indicates the forward direction of the teeth 12, 13 on the upper part of the sprocket 11 shown in FIGS. 2 and 3. The front flanks 14 of the narrow teeth 12 contacts the rollers 7 of the chain 9 during such drive operation and is located on the right side of each tooth shown in FIGS. 2 and 3.

It can be seen that the wide teeth 13 in FIGS. 2 and 3 are twisted. For the second tooth 13 in FIG. 3, the center plane 21 as well as the radial center line 19 extending from the axis of rotation of the sprocket 11 in a radial direction are schematically shown. Further, a section of the central plane 20 of the sprocket 11 in the area of this tooth 13 is shown. It can be seen that the center plane 21 of the tooth 13 is rotated about the center line 19 with respect to the central plane 20 of the sprocket 11. This way, the wide teeth 13 have the same thickness as the narrow teeth 12 but their plane of symmetry has an angle with respect to the central plane 20 of the sprocket 11. This rotation moves the right front edge 15 of the wide tooth 13 laterally away from the central plane 20 of the sprocket 11 and closer to the inner face of the outer chain link 4. This is particularly visible in FIG. 5. Simultaneously, the left rear edge 18 of the tooth 13 is moved toward the outside away from the central plane 20 and closer to the inner face of the left outer chain link 3. Consequently, the right front edge 15 and the left rear edge 18 have a larger distance from one another than the front and rear edges of the narrow teeth 12 which extend parallel to the central plane 20 of the sprocket 11.

Figure 4:
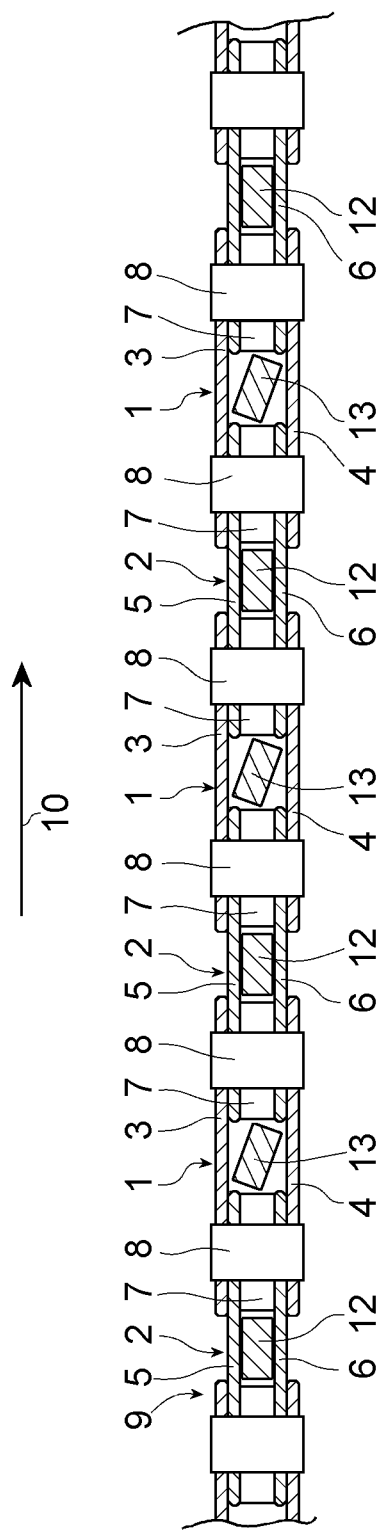
FIG. 4 shows a sectional view of the chain of FIG. 1 with the engaged teeth of the sprocket of FIGS. 2 and 3.
Figure 5:
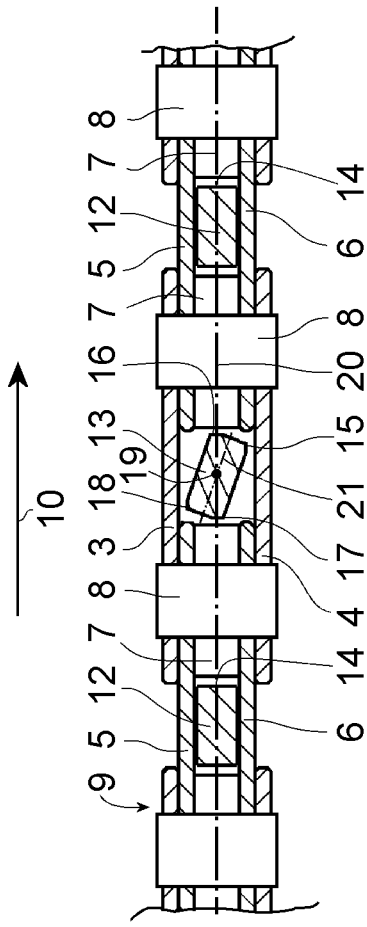
FIG. 5 shows an enlarged sectional view of the chain of FIG. 4 with the engaged teeth.

FIG. 4 shows a succession of chain links 1 and 2 with the inserted teeth 12 and 13. It is to be noted that the teeth 12 and 13 which are arranged in a circular arrangement on the sprocket 11 are drawn as if they were arranged on a straight plane in FIGS. 4 and 5. FIG. 5 shows an enlarged view of the central wide tooth 13 and visualizes the details of the configuration of that tooth 13. It can be clearly seen that the twisted wide teeth 13 have the same thickness as the narrow teeth 12 but extend within the chain link having the great width with little play because they are twisted. The right front edge 15 is close to the inner face of the right outer chain link 4 and the left rear edge 18 is close to the inner face of the left outer chain link 3. Simultaneously, the left front edge 16 and the right rear edge 17 move closer to the central plane 20 of the sprocket 11 and form the material of the tooth 13 closest to the adjacent roller 7. The left front edge 16 forms the front edge of the tooth 13 that contacts the roller 7. In order to avoid excessively high contact pressure, the left front edges 16 of each wide tooth 13 comprises a chamfer that increases the contact surface between the tooth 13 and the adjacent roller 7 in front of the tooth 13. It can be seen that the edges 15, 18 of the teeth 13 that are twisted outwardly in the lateral direction, form lateral protrusions of the teeth 13 on the front right side and the rear left side that remove the lateral play between the outer link plates 3,4 (see FIG. 4) and the wide tooth 13. In particular, FIG. 5 shows that also the lateral edges 15, 18 of the twisted teeth 13 have a chamfer in order to avoid excessive use caused by sharp edges contacting the outer chain links 3, 4. For the same reason the rear edge 17 has a chamfer and not a sharp edge.

The chain rings 11 are generally forged and the twisted shape of the wide teeth 13 and the chamfers on the edges of the wide teeth 13 can be obtained by respectively formed forging dices. Thus, the production of the wide teeth 13 does not add to the overall production time or cost of the sprocket 11. Although the twisted wide teeth 13 fit between the outer link plates 3,4 with little play, they do not fill the entire space and can easily penetrate the space between the outer link plates 3,4.

Figure 6:
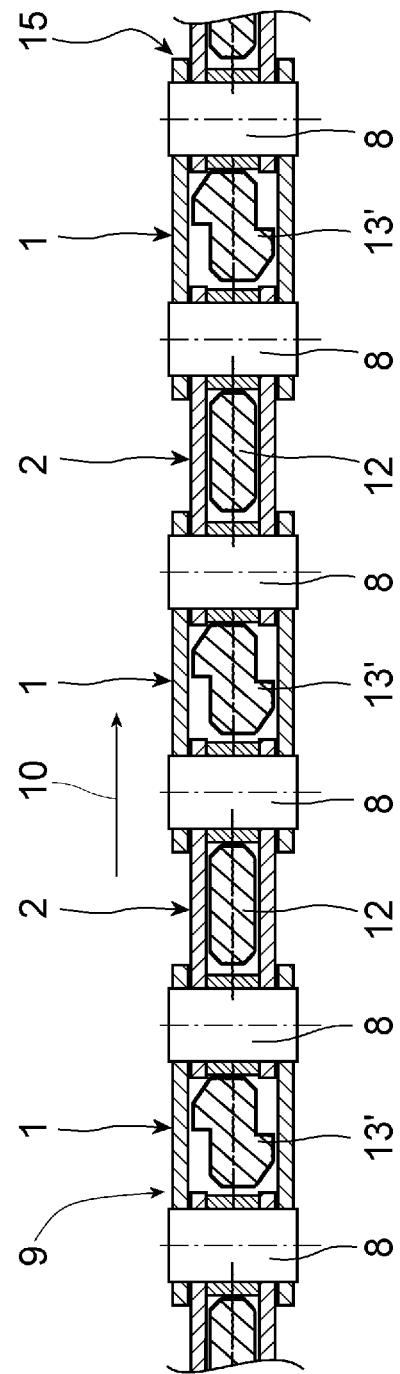
FIG. 6 shows a sectional view of the chain of FIG. 5 with an alternative configuration of teeth engaged with the chain.

FIG. 6 shows a view of the chain similar to FIG. 3, wherein the wide teeth 13' engaging the chain 9 have a different shape. The wide teeth 13' in this case extend in the central plane of the sprocket but have protrusions on opposite positions of their lateral faces. When viewed in the direction of rotation 10, the protrusion on the left lateral face is in the front half and the protrusion on the right lateral face is in the rear half. This way, the wide teeth 13' also fill the space between the two outer link plates 3,4 with little play while not filling the entire space. The cross section of the wide teeth 13' is similarly rotated with respect to the central plane of the sprocket, while the wide teeth 13' are not physically twisted about their central line extending in the radial direction of the sprocket.

Both versions permit an easy penetration of the large spaces $D_1$ between the outer link plates 3, 4 as the link space is not completely filled by the material of the teeth 13, 13' while allowing for a good guidance within the space between the outer link plates 3,4 with little play.

LIST OF REFERENCE NUMBERS

1 outer chain link
2 inner chain link
3 outer link plate
4 outer link plate
5 inner link plate
6 inner link plate
7 roller
8 pin
9 chain
10 direction of rotation
11 sprocket
12 narrow tooth
13 wide tooth
13' wide tooth
14 front flank
15 right front edge
16 left front edge
17 right rear edge
18 left rear edge
19 radial center line of the tooth
20 central plane of the sprocket
21 center plane of the tooth
$D_1$ great width
$D_2$ smaller width

The invention claimed is:

1. A sprocket for engagement with a drive chain, comprising:
    a central plane extending radially with respect to the axis of rotation;
    a plurality of teeth extending radially from a periphery of the sprocket;
    each tooth of the plurality of teeth extending over a given circumferential length of the sprocket;
    the plurality of teeth including a first group of teeth and a second group of teeth, wherein the teeth of the first group and the second group are alternately arranged so that each tooth of the first tooth group is followed by a tooth of the second group, and vice versa;
    each tooth of the first group of teeth having a first maximum width in the axial direction;
    each tooth of the second group of teeth having a second maximum width in the axial direction which is larger than the first maximum width;
wherein the profile of each tooth of the second group has a first protrusion in the front half of the tooth on a first lateral surface and a second protrusion in the rear half of the tooth on a second, opposite lateral surface of the tooth, wherein the first lateral surface and the second lateral surface of each tooth of the second group of teeth extend longitudinally.

2. The sprocket of claim 1, wherein a portion of each tooth of the second group engaging the drive chain has a center plane that is rotated about a radial center line of the tooth with respect to the central plane of the sprocket.

3. The sprocket of claim 2, wherein an angle of the center plane of each tooth of the second group and the central plane of the sprocket is 25° or less.

4. The sprocket of claim 1, wherein at least a front edge of each tooth of the second group of teeth is chamfered.

5. The sprocket of claim 1, wherein the outer lateral edges of each tooth of the second group of teeth are chamfered.

6. A method of producing a sprocket for engagement with a drive chain, comprising forging the sprocket such that the sprocket comprises:
    a central plane extending radially with respect to the axis of rotation;
    a plurality of teeth extending radially from a periphery of the sprocket;
    each tooth of the plurality of teeth extending over a given circumferential length of the sprocket;
    the plurality of teeth including a first group of teeth and a second group of teeth, wherein the teeth of the first group and the second group are alternately arranged so that each tooth of the first tooth group is followed by a tooth of the second group, and vice versa;
    each tooth of the first group of teeth having a first maximum width in the axial direction;
    each tooth of the second group of teeth having a second maximum width in the axial direction which is larger than the first maximum width;
wherein the profile of each tooth of the second group is formed so that it has a first protrusion in the front half of the tooth on a first lateral surface and a second protrusion in the rear half of the tooth on a second, opposite lateral surface of the tooth.

7. The method of claim 6, wherein a portion of each tooth of the second group engaging the drive chain has a center plane that is rotated during forming about a radial center line of the tooth with respect to a central plane of the sprocket.

8. The method of claim 7, wherein the angle of the center plane of each tooth of the second group and the central plane of the sprocket is 25° or less.

9. The method of claim 6, wherein a twisted shape of the second group of teeth and the chamfers on the edges of each tooth of the second group of teeth are obtained by respectively formed forging dies.

* * * * *